(12) United States Patent
Kwon et al.

(10) Patent No.: US 9,378,879 B2
(45) Date of Patent: Jun. 28, 2016

(54) METHOD OF PREPARING TRANSITION METAL PNICTIDE MAGNETOCALORIC MATERIAL, TRANSITION METAL PNICTIDE MAGNETOCALORIC MATERIAL, AND DEVICE INCLUDING THE SAME

(71) Applicant: Samsung Electronics Co., Ltd., Suwon-si, Gyeonggi-do (KR)

(72) Inventors: Soon-jae Kwon, Yongin-si (KR); Tae-gon Kim, Hwaseong-si (KR); Kyung-han Ahn, Uijeongbu-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 457 days.

(21) Appl. No.: 13/780,167

(22) Filed: Feb. 28, 2013

(65) Prior Publication Data

US 2013/0264512 A1  Oct. 10, 2013

(30) Foreign Application Priority Data

Apr. 4, 2012  (KR) .................. 10-2012-0035108

(51) Int. Cl.
*H01F 1/01* (2006.01)
*C01B 35/04* (2006.01)

(52) U.S. Cl.
CPC ............... *H01F 1/015* (2013.01); *C01B 35/04* (2013.01); *H01F 1/012* (2013.01)

(58) Field of Classification Search
None
See application file for complete search history.

(56) References Cited

U.S. PATENT DOCUMENTS

2011/0041513 A1* 2/2011 Reesink ............................ 62/3.1
2012/0032105 A1* 2/2012 Seeler et al. .................... 252/67

FOREIGN PATENT DOCUMENTS

| JP | 2006-265631 A | | 10/2006 |
|---|---|---|---|
| JP | 2009-054776 A | | 3/2009 |
| KR | 10-2011-0036700 A | | 4/2011 |
| KR | 10-2011-0101736 A | * | 9/2011 |
| KR | 10-1076937 B1 | | 10/2011 |
| KR | 10-2013-0000969 A | * | 1/2013 |

* cited by examiner

*Primary Examiner* — George Wyszomierski
(74) *Attorney, Agent, or Firm* — Cantor Colburn LLP

(57) ABSTRACT

A method of preparing a boron-doped transition metal pnictide magnetocaloric material, the method including: contacting a transition metal halide; a pnictogen element, a pnictogen oxide, or a combination thereof; a boron-containing oxide; and a reducing metal to provide a mixture; and heat treating the mixture to prepare the boron-doped transition metal pnictide magnetocaloric material.

18 Claims, 15 Drawing Sheets

METHOD OF PREPARING TRANSITION METAL PNICTIDE MAGNETOCALORIC MATERIAL, TRANSITION METAL PNICTIDE MAGNETOCALORIC MATERIAL, AND DEVICE INCLUDING THE SAME

CROSS-REFERENCE TO RELATED APPLICATIONS

This application claims priority to and the benefit of Korean Patent Application No. 10-2012-0035108, filed on Apr. 4, 2012, and all the benefits accruing therefrom under 35 U.S.C. §119, the content of which is incorporated herein in its entirety by reference.

BACKGROUND

1. Field

The present disclosure relates to a magnetocaloric material, and more particularly, to a transition metal pnictide magnetocaloric material.

2. Description of the Related Art

Much attention has been paid to the potential of transition metal pnictide magnetocaloric materials such as MnAs and MnFePAs for practical use in magnetic refrigerators, heat pumps, and the like, because such materials can provide suitable performance at a desirable cost. However, transition metal pnictide magnetocaloric materials have strong thermal hysteresis and magnetic hysteresis properties.

Thus there remains a need for an improved magnetocaloric material and method of manufacture thereof.

SUMMARY

Provided are methods of preparing a transition metal pnictide magnetocaloric material uniformly doped with boron.

Additional aspects, features, and advantages will be set forth in part in the description which follows and, in part, will be apparent from the description.

According to an aspect, a method of preparing a boron-doped transition metal pnictide magnetocaloric material includes contacting a transition metal halide; a pnictogen element, a pnictogen oxide, or a combination thereof; a boron oxide; and a reducing metal to provide a mixture; and heat-treating the mixture to provide the boron-doped transition metal pnictide magnetocaloric material.

The transition metal halide may include, for example, a halide of Mn, Fe, Co, Ni, Cr, V, Cu, Nb, Y, La, Ce, Pr, Nd, Pm, Sm, Eu, Gd, Tb, Dy, Ho, Er, Tm, Yb, or a combination thereof.

The transition metal halide may include, for example, a transition metal fluoride, a transition metal chloride, a transition metal bromide, a transition metal iodide, or a combination thereof.

The transition metal halide may include, for example, $MnF_3$, $MnF_4$, $MnCl_2$, $MnCl_3$, $MnBr_2$, $MnI_2$, $FeF_2$, $FeF_3$, $FeCl_3$, $FeCl_2$, $FeBr_2$, $FeBr_3$, $FeI_2$, $FeI_3$, $CoF_2$, $CoF_3$, $CoF_4$, $CoCl_2$, $CoCl_3$, $CoBr_2$, $CoI_2$, $NiF_2$, $NiCl_2$, $NiI_2$, $CrF_2$, $CrF_3$, $CrF_4$, $CrF_5$, $CrF_6$, $CrCl_2$, $CrCl_3$, $CrCl_4$, $CrBr_2$, $CrBr_3$, $CrBr_4$, $CrI_2$, $CrI_3$, $CrI_4$, $VF_2$, $VF_3$, $VF_4$, $VF_5$, $VCl_2$, $VCl_3$, $VCl_4$, $VBr_2$, $VBr_3$, $VBr_4$, $VI_2$, $VI_3$, $VI_4$, $CuF$, $CuF_2$, $CuCl$, $CuCl_2$, $CuBr_2$, $CuI$, or a combination thereof.

The transition metal halide may include a rare-earth metal halide and may include, for example, $LaF_3$, $LaCl_3$, $LaBr_3$, $LaI_3$, $CeF_3$, $LaCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmCl_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, $YbI_3$, or a combination thereof.

The pnictogen element may include, for example, P, As, Sb, Bi or a combination thereof. The pnictogen oxide may include, for example, an oxide of P, As, Sb, Bi or a combination thereof.

The boron-containing oxide may include $B_2O_3$, $NaBO_2$, $BO_3H_3$, or a combination thereof.

The reducing metal may be Li, Na, K, Rb, Cs, Be, Mg, Ca, Sr, Ba, Al, or a combination thereof.

The content of the boron-containing oxide in the mixture may be selected such that the content of boron is in the range of about 0.001 atomic percent (at. %) to about 10 at. %, based on a total amount of the boron-doped transition metal pnictide compound.

The content of the reducing metal in the mixture may be about 100 parts by weight to about 150 parts by weight, based on a total weight of the transition metal halide and the pnictogen oxide.

The heat-treatment temperature of the mixture may be about 300 to about 1200° C., about 300 to about 900° C., or about 300 to about 700° C.

A method of preparing a boron-doped transition metal pnictide magnetocaloric material according to another embodiment may further include removing a by-product from the heat-treated reaction mixture.

According to a method of preparing a boron-doped transition metal pnictide magnetocaloric material according to another embodiment, at least one component of the reaction mixture may melt during the heat-treatment to form a liquid phase medium.

According to a method of preparing a boron-doped transition metal pnictide magnetocaloric material according to another embodiment, the mixture may further include at least one type of reducing metal halide.

According to another aspect, there is provided a boron-doped transition metal pnictide magnetocaloric material prepared by the method of preparing a boron-doped transition metal pnictide magnetocaloric material.

Also disclosed is a boron-doped transition metal pnictide magnetocaloric material including a transition metal, a pnictide, and boron.

The boron-doped transition metal pnictide magnetocaloric material may be a spherical particle.

The boron-doped transition metal pnictide magnetocaloric material may be a single crystalline particle.

The boron-doped transition metal pnictide magnetocaloric material may have an average particle size of about 10 nanometers (nm) to about 50 micrometers (μm).

The content of the boron in the boron-doped transition metal pnictide magnetocaloric material may be about 0.001 at. % to about 10 at. %, based on 100 at. % of the boron-doped transition metal pnictide compound.

According to another aspect, disclosed is a magnetocaloric material represented by Formula 2:

$$Mn_aFe_b(P_cAs_d):B_x, \quad \text{Formula 2}$$

wherein a is about 0 to about 1, b is about 0 to about 1, a+b=1, c is about 0 to about 1, d is about 0 to about 1, c+d=1, and x is about 0.001 to about 0.1.

Also disclosed is a method of preparing a magnetocaloric material, the method including: contacting a transition metal halide; a pnictogen element, a pnictogen oxide, or a combination thereof; a boron-containing oxide; and a reducing metal to provide a mixture; providing a reducing metal halide of the formula LiX, NaX, KX, RbX, CsX, $BeX_2$, $MgX_2$, $CaX_2$, $SrX_2$, $BaX_2$, $AlX_3$, or a combination thereof, wherein X is F, Cl, Br, I, or combination thereof; heat-treating the mixture and the reducing metal halide at about 400 to about 800° C. to form a eutectic mixture; and washing the eutectic mixture with an aqueous solution to prepare the boron-doped transition metal pnictide magnetocaloric material.

Also disclosed is a device, the device including the boron-doped transition metal pnictide magnetocaloric material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
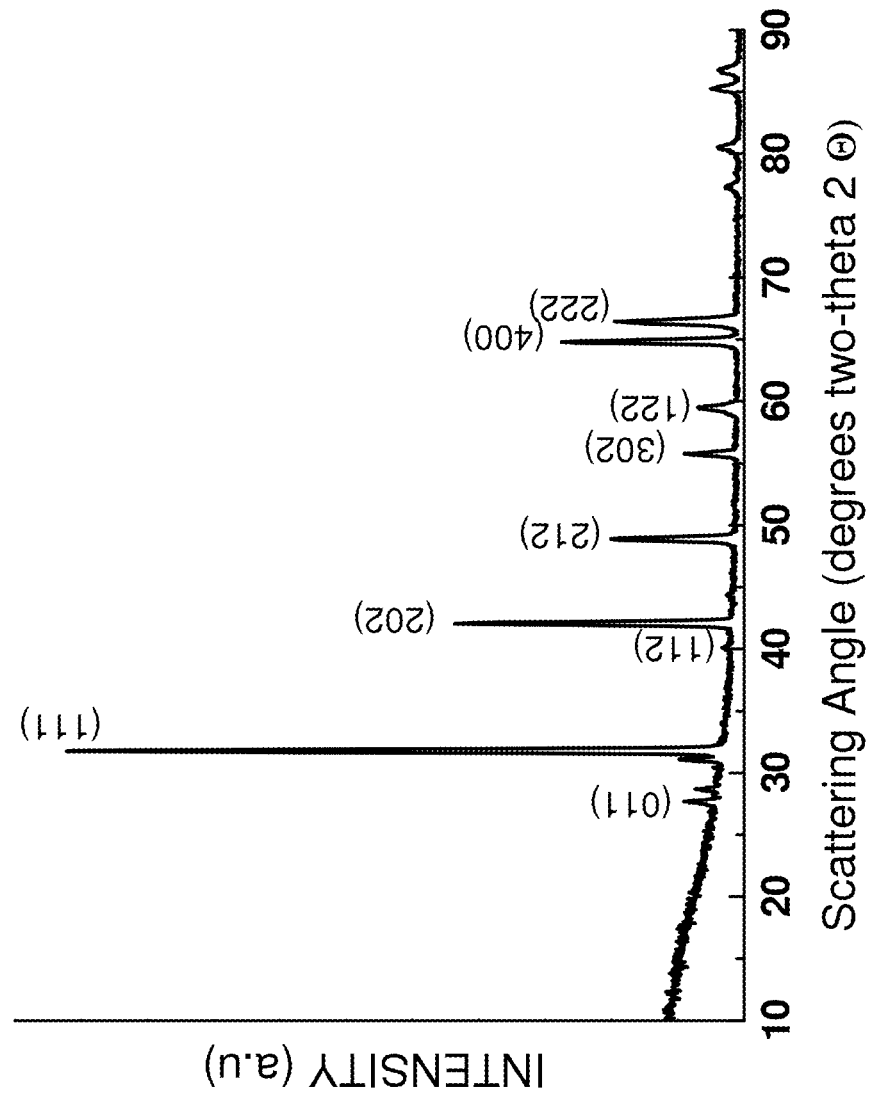
FIG. 1 is a graph of intensity (arbitrary units) versus scattering angle (degrees two theta, 2θ) illustrating the results of X-ray diffraction analysis of the boron-doped MnAs-based magnetocaloric material $MnAsB_{0.02}$ of Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "a combination thereof" refers to a combination comprising at least one of the named components, compounds, or elements, optionally together with one or more like components, compounds, or elements not named. For convenience, the term "mixture" is used to refer to any combination of two different materials irrespective of the form, and thus includes solutions, dispersions, emulsions, alloys, physical mixtures, and the like.

In order to control hysteresis in transition metal pnictide magnetocaloric materials, doping, e.g., interstitial doping, with an element having a small atomic radius, such as boron, can be used.

A transition metal pnictide magnetocaloric material base composition may be prepared, for example, by sequentially high-energy ball milling and heat-treating. The transition metal pnictide magnetocaloric material base composition may be doped with boron by, for example, an induction heating process.

The melting point of boron is about 2076° C. At such a high temperature, a pnictogen element, such as P, As, Sb, and Bi, contained in the transition metal pnictide magnetocaloric material is easily vaporized. Thus, it is difficult to maintain the base composition of the transition metal pnictide magnetocaloric material while doping the transition metal pnictide magnetocaloric material with boron while using an arc-melting or an induction heating process. Furthermore, it is also difficult to uniformly dope the transition metal pnictide magnetocaloric material with boron when using these methods.

Disclosed is a method of preparing a boron-doped transition metal pnictide magnetocaloric material which includes contacting a transition metal halide, a pnictogen element, a pnictogen oxide, or a combination of the pnictogen element and the pnictogen oxide, a boron-containing oxide, and a reducing metal to provide a mixture; and heat-treating the mixture to provide the boron-doped transition metal pnictide magnetocaloric material. As is further disclosed below, the disclosed method provides a boron-doped transition metal pnictide magnetocaloric material having the desired composition. The boron-doped transition metal pnictide magnetocaloric material provides improved performance.

The transition metal halide is a transition metal source for the transition metal pnictide compound. The pnictogen element or pnictogen oxide is a pnictogen source for the transition metal pnictide compound. During the heat-treatment process, and while not wanting to be bound by theory, it is understood that the transition metal halide may combine with (e.g., react with) the pnictogen element or pnictogen oxide to generate the transition metal pnictide compound. The generated transition metal pnictide compound may be amorphous, crystalline, or polycrystalline. In an embodiment the transition metal pnictide compound is polycrystalline. It is also understood that the boron-containing oxide is reduced to elemental boron by the reducing metal. The reduced boron is combined with the transition metal pnictide and may be doped in the transition metal pnictide while the transition metal pnictide crystals are generated and grow. For example, the boron may be on a crystal of the transition metal pnictide, between crystallites of the transition metal pnictide, between grains of the transition metal pnictide, or within the crystal lattice of the transition metal pnictide. In an embodiment, the boron is an interstitial dopant, and is between grains of the transition metal pnictide, wherein a grain is a single crystal region of a particle of the transition metal pnictide. The transition metal pnictide may be prepared by heat-treatment at a low temperature of about 400 to about 800° C., specifically about 450 to about 750° C., more specifically about 500 to about 700° C. Accordingly, uniform doping of the boron may be efficiently performed without undesirably changing the base composition of the transition metal pnictide compound. In the temperature range described above, vaporization of the pnictogen element, such as P, As, Sb, or Bi, contained in the transition metal pnictide compound may be substantially prevented or effectively eliminated. Furthermore, and while not wanting to be bound by theory, it is understood that because the boron is doped during the generation and growth of the transition metal pnictide crystals, the boron may be uniformly doped.

The transition metal halide may be a transition metal source, and may also lower a diffusion barrier of elements of a reaction mixture. Accordingly, the generation and growth of the transition metal pnictide crystals may be accelerated even at a low temperature. Thus, a time and an energy for the preparation of the magnetocaloric material may be reduced. In addition, uniform doping of boron may be accelerated.

The transition metal halide may be a halide of transition metal, and may comprise Mn, Fe, Co, Ni, Cr, V, Cu, Nb, Y, La, Ce, Pr, Nd, Pm, Sm, Eu, Gd, Tb, Dy, Ho, Er, Tm, Yb, or a combination thereof, specifically Mn, Fe, Co, Ni, Cr, V, Cu, or a combination thereof. Mn and Fe are specifically mentioned.

The transition metal halide may comprise a Group 17 element, and may be, for example, a transition metal fluoride, a transition metal chloride, a transition metal bromide, or a transition metal iodide. A combination of halides may be used.

Particularly, the transition metal halide may comprise $MnF_3$, $MnF_4$, $MnCl_2$, $MnCl_3$, $MnBr_2$, $MnI_2$, $FeF_2$, $FeF_3$, $FeCl_3$, $FeCl_2$, $FeBr_2$, $FeBr_3$, $FeI_2$, $FeI_3$, $CoF_2$, $CoF_3$, $CoF_4$, $CoCl_2$, $CoCl_3$, $CoBr_2$, $CoI_2$, $NiF_2$, $NiCl_2$, $NiI_2$, $CrF_2$, $CrF_3$, $CrF_4$, $CrF_5$, $CrF_6$, $CrCl_2$, $CrCl_3$, $CrCl_4$, $CrBr_2$, $CrBr_3$, $CrBr_4$, $CrI_2$, $CrI_3$, $CrI_4$, $VF_2$, $VF_3$, $VF_4$, $VF_5$, $VCl_2$, $VCl_3$, $VCl_4$, $VBr_2$, $VBr_3$, $VBr_4$, $VI_2$, $VI_3$, $VI_4$, $CuF$, $CuF_2$, $CuCl$, $CuCl_2$, $CuBr_2$, $CuI$, or a combination thereof. In an embodiment, the transition metal halide is $MnF_3$, $MnF_4$, $MnCl_2$, $MnCl_3$, $MnBr_2$, $MnI_2$, $FeF_2$, $FeF_3$, $FeCl_3$, $FeCl_2$, $FeBr_2$, $FeBr_3$, $FeI_2$, $FeI_3$, $CoF_2$, $CoF_3$, $CoF_4$, $CoCl_2$, $CoCl_3$, $CoBr_2$, $CoI_2$, $NiF_2$, $NiCl_2$, $NiI_2$, $CrF_2$, $CrF_3$, $CrF_4$, $CrF_5$, $CrF_6$, $CrCl_2$, $CrCl_3$, $CrCl_4$, $CrBr_2$, $CrBr_3$, $CrBr_4$, $CrI_2$, $CrI_3$, $CrI_4$, $VF_2$, $VF_3$, $VF_4$, $VF_5$, $VCl_2$, $VCl_3$, $VCl_4$, $VBr_2$, $VBr_3$, $VBr_4$, $VI_2$, $VI_3$, $VI_4$, $CuF$, $CuF_2$, $CuCl$, $CuCl_2$, $CuBr_2$, or $CuI$. Manganese chloride and iron chloride, specifically $MnCl_2$ and $FeCl_3$, are specifically mentioned.

The transition metal halide may comprise a halide of a rare-earth metal such as Nb, Y, La, Ce, Pr, Nd, Pm, Sm, Eu, Gd, Tb, Dy, Ho, Er, Tm, Yb, or a combination thereof.

Particularly, the rare-earth metal halide may comprise $LaF_3$, $LaCl_3$, $LaBr_3$, $LaI_3$, $CeF_3$, $LaCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmCl_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, $YbI_3$, or a combination thereof. In an embodiment, the transition metal halide is $LaF_3$, $LaCl_3$, $LaBr_3$, $LaI_3$, $CeF_3$, $LaCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmCl_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, or $YbI_3$.

In another embodiment, the transition metal halide is a combination of $MnF_3$, $MnF_4$, $MnCl_2$, $MnCl_3$, $MnBr_2$, $MnI_2$, $FeF_2$, $FeF_3$, $FeCl_3$, $FeCl_2$, $FeBr_2$, $FeBr_3$, $FeI_2$, $FeI_3$, $CoF_2$, $CoF_3$, $CoF_4$, $CoCl_2$, $CoCl_3$, $CoBr_2$, $CoI_2$, $NiF_2$, $NiCl_2$, $NiI_2$, $CrF_2$, $CrF_3$, $CrF_4$, $CrF_5$, $CrF_6$, $CrCl_2$, $CrCl_3$, $CrCl_4$, $CrBr_2$, $CrBr_3$, $CrBr_4$, $CrI_2$, $CrI_3$, $CrI_4$, $VF_2$, $VF_3$, $VF_4$, $VF_5$, $VCl_2$, $VCl_3$, $VCl_4$, $VBr_2$, $VBr_3$, $VBr_4$, $VI_2$, $VI_3$, $VI_4$, $CuF$, $CuF_2$, $CuCl$, $CuCl_2$, $CuBr_2$, or $CuI$; and $LaF_3$, $LaCl_3$, $LaBr_3$, $LaI_3$, $CeF_3$, $LaCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmCl_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, or $YbI_3$. In another embodiment a combination comprising at least one of the foregoing is used.

The pnictogen element or pnictogen oxide is a pnictogen source for preparing the transition metal pnictide compound. Since the pnictogen oxide is used as the pnictogen source, the boron source, e.g., the boron-containing oxide, and the pnictogen source may be simultaneously and uniformly dispersed in the reaction mixture. Alternatively, the boron source and the pnictogen source may be sequentially added.

The pnictogen is a Group 15 element. The pnictogen element may be, for example, P, As, Sb, Bi or a combination thereof. For example, the pnictogen oxide may be an oxide of P, As, Sb, Bi, or a combination thereof. Particularly, the pnictogen oxide may be $P_2O_3$, $As_2O_3$, $Sb_2O_3$, $Bi_2O_3$, or a combination thereof.

A Group 14 element, an oxide of a Group 14 element, or a combination thereof may be further included in the mixture of the transition metal halide, the pnictogen element and/or the pnictogen oxide, the boron-containing oxide, and the reducing metal. In an embodiment the Group 14 element is Si, Ge, or a combination thereof. The oxide of the Group 14 element may comprise $SiO_2$, $GeO_2$, or a combination thereof. In an embodiment, the method of preparing the boron-doped transition metal pnictide magnetocaloric material comprises contacting the transition metal halide, the pnictogen element and/or the pnictogen oxide, the boron-containing oxide, the reducing metal, and the Group 14 element, the oxide of the Group 14 element, or a combination thereof, to provide the mixture. Alternatively, the mixture of the transition metal halide, the pnictogen element and/or pnictogen oxide, the boron-containing oxide, and the reducing metal may be contacted with the Group 14 element, the oxide of a Group 14 element, or the combination thereof.

The boron-containing oxide may provide the boron which is doped on and/or in the transition metal pnictide. Since the boron-containing oxide is used as the boron source, the pnictogen source, which may be supplied as an oxide, and the boron source may be simultaneously and uniformly dispersed in the reaction mixture.

The boron-containing oxide may be, for example, $B_2O_3$, $NaBO_2$, $BO_3H_3$, or a combination thereof. $B_2O_3$ is specifically mentioned.

While not wanting to be bound by theory, it is understood that the reducing metal reacts with the transition metal halide to facilitate isolation of the transition metal from the transition metal halide and binding of the transition metal with pnictogen. In this regard, the reducing metal is understood to be converted into a halide of the reducing metal, i.e. a reducing metal halide. In addition, the reducing metal may react with the pnictogen oxide to facilitate isolation of the pnictogen from the pnictogen oxide and binding of the pnictogen with the transition metal. In this regard, the reducing metal is understood to be converted into an oxide of the reducing metal. Due to this function of the reducing metal, a special condition, such as a high vacuum and/or a reducing atmosphere, may be avoided when preparing the boron-doped transition metal pnictide magnetocaloric material.

The reducing metal may acts as a flux in the reaction mixture to improve the crystallinity of the transition metal pnictide.

As is further disclosed above, by-products such as a halide and/or an oxide of the reducing metal may be produced from the reducing metal. These by-products may be uniformly dispersed in the reaction mixture. Accordingly, these by-products may uniformly limit the growth of the transition metal pnictide crystals.

The reducing metal may be, for example, Li, Na, K, Be, Mg, Ca, Sr, Ba, Al, or a combination thereof. An embodiment in which the reducing metal is Na or Mg is specifically mentioned.

The mixture of the transition metal halide, the pnictogen element and/or the pnictogen oxide, the boron-containing oxide, and the reducing metal may be obtained using, for example, a ball mill, an attrition mill, a jet mill, a spike mill, or a combination thereof.

In the mixture, the ratio of the transition metal halide to the pnictogen element and/or the pnictogen oxide may be selected to provide a corresponding, ratio of the transition metal and pnictide in the base component of the transition metal pnictide compound to be obtained.

In the mixture, the content of the boron-containing oxide may be selected to provide the desired content of boron in the boron-doped transition metal pnictide magnetocaloric material. For example, the content of boron-containing oxide may be selected such that the content of boron is about 0.001 atomic percent (at. %) to about 10 at. %, specifically 0.005 at. % to about 5 at. %, more specifically 0.01 at. % to about 1 at. %, based on a total amount of the boron-doped transition metal pnictide compound. Also, the amount of the boron-containing oxide may be selected such that the boron in the boron-doped transition metal pnictide magnetocaloric material is present in an amount of about 0.001 wt. % to about 10 wt. %, specifically 0.005 wt. % to about 5 wt. %, more specifically 0.01 wt. % to about 1 wt. %, based a total weight of the boron-doped transition metal pnictide compound.

In the mixture, the content of the reducing metal may be selected to provide an amount suitable for reducing the transition metal and pnictogen by the reaction with the transition metal halide and pnictogen oxide. For example, the content of the reducing metal may be about 50 to about 200 parts by weight, specifically about 100 to about 150 parts by weight, more specifically about 110 to about 140 parts by weight, based on a total weight of the transition metal halide and the pnictogen oxide.

By heat-treating of the mixture, a reaction among the transition metal halide, the pnictogen element and/or the pnictogen oxide, the boron-containing oxide, and the reducing metal may proceed, crystals of the boron-doped transition metal pnictide may grow, and by-products, such as the halide and/or oxide of the reducing metal, are produced.

The temperature for the heat-treatment of the mixture may be, for example, equal to or less than a melting point of the boron-doped transition metal pnictide crystals. Particularly, the heat-treatment of the mixture may be performed at a temperature of about 300 to about 1200° C., specifically about 300 to about 900° C., or about 300 to about 700° C., more specifically about 350 to about 650° C. Since the transition metal halide lowers the diffusion barrier of the elements in the reaction mixture, the generation and growth of the transition metal pnictide crystals may efficiently proceed.

A plurality of heat treatments may be used. In an embodiment, a product of the heat treatment of the mixture may be annealed. The annealing may comprise heat treating at about 300 to about 1200° C., specifically about 400 to about 900° C., or about 500 to about 700° C.

If the heat-treatment temperature is higher than about 700 to about 900° C., or higher than the melting point of the transition metal pnictide, the reducing metal may penetrate the transition metal pnictide crystals, the growth of the crystals may proceed in an undesirable manner, or the magnetocaloric effect may deteriorate.

The heat-treatment time of the mixture is not particularly limited. For example, the mixture may be heat-treated for about 10 minutes to about 20 hours, specifically about 20 minutes to about 18 hours, more specifically about 30 minutes to about 16 hours. According to an embodiment, a magnetocaloric material with a desired crystal size may be obtained by performing the heat-treatment for about 10 minutes to about 20 hours. Also, the time of the annealing is not particularly limited. For example, the annealing may be conducted for about 10 minutes to about 20 hours, specifically about 20 minutes to about 18 hours, more specifically about 30 minutes to about 16 hours. If an additional heat treatment is used, the forgoing temperature and time may be used.

The heat-treatment may be performed in an oxygen free atmosphere. The oxygen free atmosphere is advantageous for the generation of the transition metal pnictide by the reaction among the reducing metal, the transition metal halide, and pnictide oxide. The oxygen free atmosphere of the heat-treatment may be, for example, a vacuum; or an inert gas atmosphere comprising an inert gas such as argon or helium.

The halide or oxide of the reducing metal in the heat-treated reaction mixture may or may not be removed therefrom. The by-products of the reaction, e.g., the halide or oxide of the reducing metal, may be removed from the heat-treated reaction mixture by water leaching, acid leaching, base leaching, or a combination thereof.

The boron-doped transition metal pnictide crystals in the heat-treated reaction mixture may not be dissolved in or may not react with water, an acid, or a base. Thus, by-products, such as the reducing metal halide and the reducing metal oxide, may be selectively removed by washing with an aqueous solution, such as water leaching, acid leaching, or base leaching.

An acidic aqueous solution having a concentration of about 0.01 molar (M) to about 1 M, specifically about 0.05 M to about 0.8 M, more specifically about 0.1 M to about 0.5 M may be used for the acid leaching. The acidic aqueous solution may include, for example, a hydrochloric acid solution, a nitric acid solution, a formic acid solution, an acetic acid solution, or a combination thereof. A basic aqueous solution having a concentration of about 0.01 M to about 1 M, specifically about 0.05 M to about 0.8 M, more specifically about 0.1 M to about 0.5 M may be used for the base leaching. The basic aqueous solution may include, for example, a sodium hydroxide solution, a calcium hydroxide solution, an ammonium hydroxide solution, or a combination thereof. The washing may be conducted before or after the annealing, or before and after the annealing.

The particle size of the obtained boron-doped transition metal pnictide magnetocaloric material may be selected by controlling the heat-treatment temperature and a content of a eutectic molten salt mixture, if present. For example, an average particle size, e.g., average largest particle size, of the obtained magnetocaloric material may be in the range of about 10 nanometers (nm) to about 50 µm, specifically about 20 nm to about 25 µm, more specifically about 40 nm to about 1 µm. Also, the particle size of the magnetocaloric material may be about 1 nm to about 100 µm, specifically about 10 nm to about 50 µm, more specifically about 20 nm to about 1 µm.

According to another embodiment, at least one element of the reaction mixture may melt during the heat-treatment to form a liquid phase medium.

For example, at least one element of the mixture may melt during the heat-treatment. For example, the transition metal halide may include a plurality of transition metal halides, e.g., at least two types of transition metal halides, and the plurality of transition metal halides may form a eutectic mixture that may melt during the heat-treatment. For example, the reducing metal halide and the transition metal halide produced during the heat-treatment may form a eutectic mixture that may melt during the heat-treatment. For example, the reducing metal may include at least two types of reducing metals, and the at least two types of reducing metal halides produced during the heat-treatment may form a eutectic mixture that may melt during the heat-treatment.

The mixture may further include at least one type of reducing metal halide added to or included in the mixture. The reducing metal halide added to or included in the mixture of the transition metal halide, the pnictogen element and/or the pnictogen oxide, the boron-containing oxide, and the reducing metal, and the reducing metal halide may form a eutectic mixture with the transition metal halide, wherein the eutectic mixture may melt during the heat-treatment. Also, the reducing metal halide added to or included in the mixture may form a eutectic mixture with the reducing metal halide produced during the heat-treatment, wherein the eutectic mixture may melt during the heat-treatment. The at least two types of the reducing metal halide added to the mixture may form a eutectic mixture that may melt during the heat-treatment. The reducing metal halide may comprise LiF, NaF, KF, RbF, CsF, BeF$_2$, MgF$_2$, CaF$_2$, SrF$_2$, BaF$_2$, AlF$_3$, LiCl, NaCl, KCl, RbCl, CsCl, BeCl$_2$, MgCl$_2$, CaCl$_2$, SrCl$_2$, BaCl$_2$, AlCl$_3$, LiBr, NaBr, KBr, RbBr, CsBr, BeBr$_2$, MgBr$_2$, CaBr$_2$, SrBr$_2$, BaBr$_2$, AlBr$_3$, LiI, NaI, KI, RbI, CsI, BeI$_2$, MgI$_2$, CaI$_2$, SrI$_2$, BaI$_2$, AlI$_3$, or a combination thereof. MgCl$_2$ and NaCl are specifically mentioned.

The eutectic mixture may have a melting point lower than a single metal halide. Accordingly, metallic pnictide crystals may grow in a liquid phase medium at a lower temperature when using the eutectic mixture than when using the single metal halide. For example, when magnesium is used as the reducing metal, MgCl$_2$ generated during the reaction and NaCl added to the mixture may form an MgCl$_2$—NaCl eutectic mixture. The MgCl$_2$—NaCl eutectic mixture may form a liquid phase medium at 500° C. or less, specifically at about 450° C. to about 500° C. The eutectic mixture may include LiX, NaX, KX, RbX, CsX, BeX$_2$, MgX$_2$, CaX$_2$, SrX$_2$, BaX$_2$, AlX$_3$, or a combination thereof, wherein X is F, Cl, Br, I, or combination thereof. For example, the combination of reducing metal halides to provide the eutectic mixture may be MgCl$_2$—LiCl, MgCl$_2$—NaCl, MgCl$_2$—KCl, MgCl$_2$—RbCl, MgCl$_2$—CsCl, or the like. A composition ratio of the metal halides capable of forming the eutectic mixture may be 1:99 to 99:1 by weight, and may be determined by inspection of a phase diagram, for example. For example, in the eutectic mixture of NaCl and MgCl$_2$, a molar ratio of MgCl$_2$/(NaCl+MgCl$_2$) may be greater than 0 and less than 1. A suitable ratio of the reducing metal halides to provide a eutectic mixture can be determined by one of skill in the art without undue experimentation.

As such, when at least one element of the reaction mixture is melted to form a liquid phase medium, transfer of elements in the reaction mixture may be accelerated even at a low heat-treatment temperature, for example, about 300 to about 900° C. Accordingly, the generation of the transition metal pnictide compound may be accelerated even at a low temperature. In addition, crystals of the boron-doped transition metal pnictide may grow in the liquid phase medium. The boron-doped transition metal pnictide that grows in the liquid phase medium may have single crystalline particles, and the boron-doped transition metal pnictide may be polycrystalline. In another embodiment, the boron-doped transition metal pnictide is amorphous. Since the single crystalline particles form a single phase, a magnetic phase transition provided upon application of a magnetic field is uniform, and the uniformity is understood to be provided by the single crystalline particles, so that magnetocaloric effect is improved.

According to another embodiment, a boron-doped transition metal pnictide magnetocaloric material prepared according to the method of preparing a boron-doped transition metal pnictide magnetocaloric material is provided.

Since boron is interstitially doped in the boron-doped transition metal pnictide magnetocaloric material, a lattice softening effect may be obtained. Accordingly, a lattice phase transition in response to a change in magnetic field may often occur. Thus, in the boron-doped transition metal pnictide magnetocaloric material, an entropy change induced by the change of the magnetic field may be rapidly increased.

A particle of the boron-doped transition metal pnictide magnetocaloric material may have any suitable shape, and may be spherical, triangular, square, hemispherical, rod shaped, or a combination thereof. Spherical particles of the transition metal pnictide magnetocaloric material are specifically mentioned. The particle of the boron-doped transition metal pnictide magnetocaloric material may be sufficiently spherical so as to reduce or effectively eliminate shape anisotropy.

The transition metal pnictide magnetocaloric material may be anisotropic, i.e., the material may have shape anisotropy. While not wanting to be bound by theory, it is understood that anisotropic crystals of the magnetocaloric material may have a layered crystal structure, and thus, such materials may have significant magnetic hysteresis, which can be undesirable for some applications.

Alternatively, the transition metal pnictide magnetocaloric material may be substantially or entirely isotropic. According to an embodiment, and while not wanting to be bound by theory, it is understood that anisotropic growth of the crystals of the transition metal pnictide magnetocaloric material is inhibited by the reducing metal halide or the eutectic mixture generated during the reaction to provide the transition metal pnictide magnetocaloric material. Therefore, the transition metal pnictide magnetocaloric material is prepared via an isotropic crystal growth mechanism, reducing or effectively eliminating shape anisotropy. Thus, the boron-doped transition metal pnictide magnetocaloric material may have an isotropic crystal shape, and may have a spherical shape, and thus, the magnetic hysteresis phenomenon may be substantially or entirely eliminated.

The boron-doped transition metal pnictide magnetocaloric material may comprise a single crystalline particle. Since a magnetic phase transition may uniformly occur in a single crystalline particle at a selected temperature or in a selected magnetic field, the magnetic entropy change increases, and thus, the magnetocaloric effect may be improved.

The boron-doped transition metal pnictide magnetocaloric material may have an average particle size, e.g., an average largest particle size, for example, of about 10 nm to about 50 μm, specifically about 20 nm to about 25 μm, more specifically about 40 nm to about 1 μm. If the particle size is too small, a magnetic moment decreases. On the other hand, if the particle size is too large, the magnetic domain is not uniform, so that magnetocaloric effects may deteriorate.

The content of the boron in the boron-doped transition metal pnictide magnetocaloric material may be about 0.001 at. % to about 10 at. %, specifically 0.005 at. % to about 5 at. %, more specifically 0.01 at. % to about 1 at. %, based a total amount of the boron-doped transition metal pnictide compound. Also, the boron in the boron-doped transition metal pnictide magnetocaloric material may be present in an amount of about 0.001 wt. % to about 10 wt. %, specifically 0.005 wt. % to about 5 wt. %, more specifically 0.01 wt. % to about 1 wt. %, based a total weight of the boron-doped transition metal pnictide compound.

According to another embodiment, a magnetocaloric material represented by Formula 1 is provided.

$$M^1_a M^2_b Q^1_c Q^2_d:B_x \qquad \text{Formula 1}$$

In Formula 1, $M^1$ and $M^2$ are each independently Mn, Fe, Co, Ni, Cr, V, Cu, Nb, Y, La, Ce, Pr, Nd, Pm, Sm, Eu, Gd, Tb, Dy, Ho, Er, Tm or Yb, or a combination thereof, a is about 0 to about 1, b is about 0 to about 1, a+b=1, $Q^1$ and $Q^2$ are each independently P, As, Sb, Bi, or a combination thereof, c is about 0 to about 1, d is about 0 to about 1, c+d=1, and x is about 0.001 to about 0.1.

According to another embodiment, the magnetocaloric material is represented by an empirical formula of Formula 2.

$$Mn_a Fe_b P_c As_d:B_x \qquad \text{Formula 2}$$

In Formula 2, a is about 0 to about 1, b is about 0 to about 1, a+b=1, c is about 0 to about 1, d is about 0 to about 1, c+d=1, and x is about 0.001 to about 0.1.

A boron-doped $M^1_a M^2_b Q^1_c Q^2_d$-based material, specifically a $Mn_a Fe_b P_c As_d$-based material, has a higher Curie temperature. For example, if x=0.02, the Curie temperature may increase by about 10° C. Also, the material may provide a lower thermal hysteresis and a higher magnetic entropy change than a material not doped with boron.

EXAMPLES

Example 1

Preparation of MnAs:B$_{0.02}$

MnCl$_2$, As$_2$O$_3$, B$_2$O$_3$ and Mg were weighed to provide a molar ratio of 1:0.5:0.01:2.53. MnCl$_2$, As$_2$O$_3$, B$_2$O$_3$ and Mg were mixed using a ball mill in air for 5 hours to obtain a powdered mixture. The powdered mixture was added to a metal mold and pressed by using a press at 300 kg/cm$^2$ to obtain a cylinder having a diameter of 1 centimeter (cm) and a height of 1 cm. An alumina crucible including the cylinder was added to a quartz tube, and the quartz tube was sealed in a vacuum. The quartz tube was heat-treated in an electrical furnace at 600° C. for 5 hours. A reaction occurring during the heat-treatment is shown in Reaction Scheme 1 below.

Reaction Scheme 1

MnCl$_2$ + 0.5As$_2$O$_3$ + 0.01B$_2$O$_3$ + 2.53Mg ⟶ MnAs:B$_{0.02}$ + MgCl$_2$ + 1.53MgO

The heat-treated reaction mixture was pulverized in an agate mortar and added to a 0.1 molar (M) hydrochloric acid solution, and the mixture was stirred for 1 hour to remove by-products such as MgCl$_2$ and MgO. The obtained MnAs:B$_{0.02}$ was washed three times with water and dried.

FIG. 1 is a graph illustrating the results of X-ray diffraction analysis of the magnetocaloric material MnAs:B$_{0.02}$ prepared in Example 1. As shown in FIG. 1, the magnetocaloric material MnAs:B$_{0.02}$ of Example 1 had a single phase and a very high degree of crystallinity.

Figure 2A:
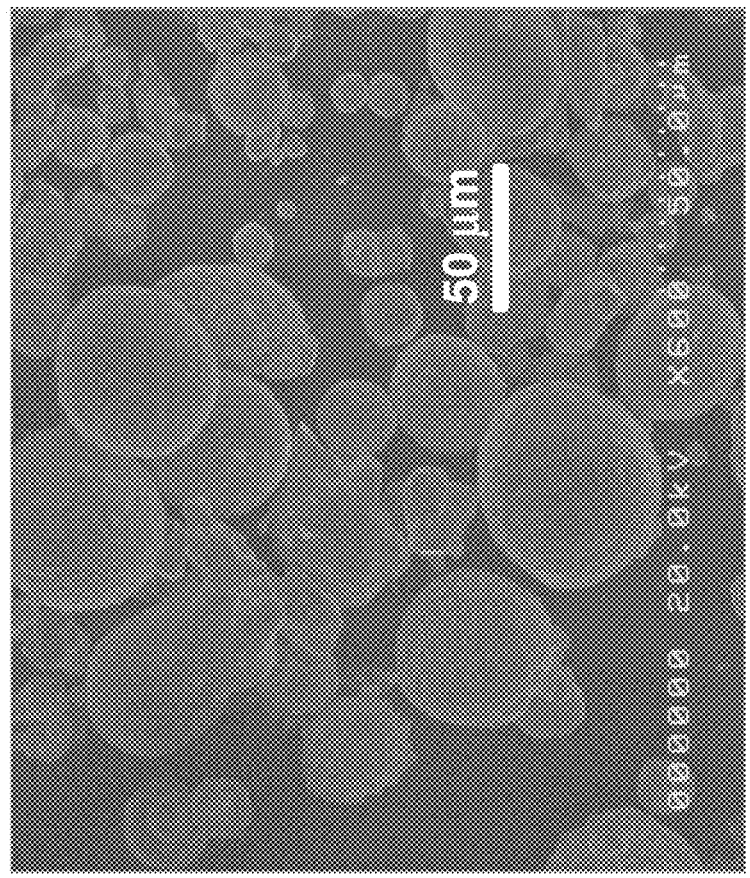
FIG. 2A shows particles of the magnetocaloric material $MnAsB_{0.02}$ of Example 1 after heat-treatment.
Figure 2B:
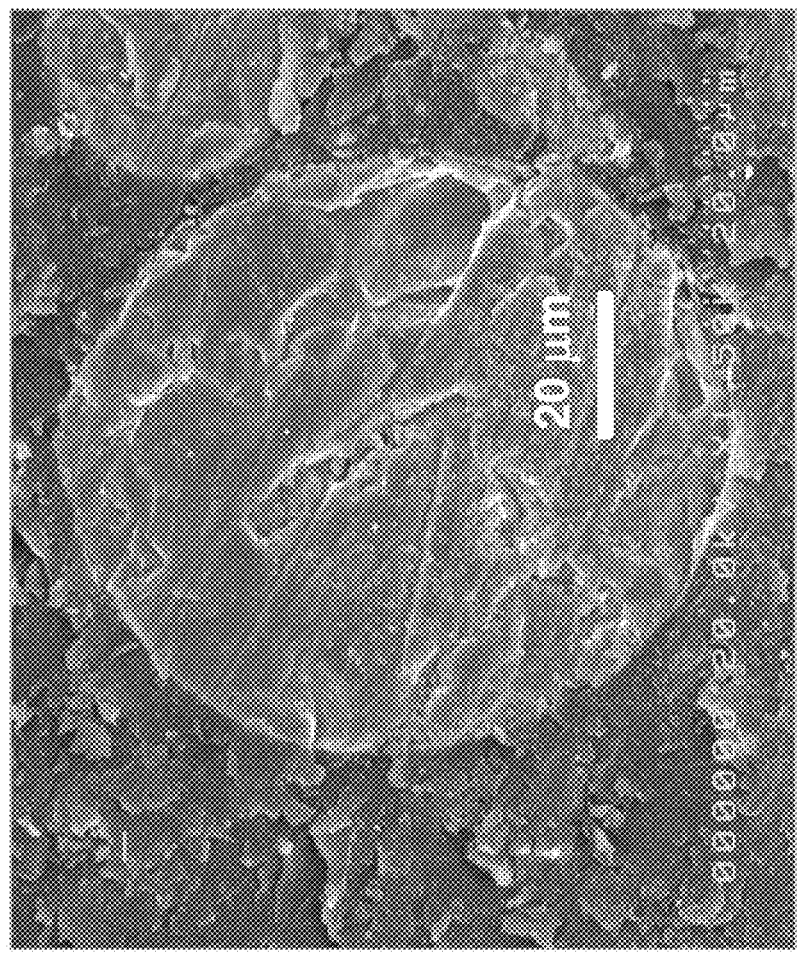
FIG. 2B is a scanning electron microscope ("SEM") image of a single particle of Example 1.

FIG. 2A is an SEM image of the magnetocaloric material MnAs:B$_{0.02}$ prepared in Example 1. FIG. 2B is an SEM image of a single particle of the magnetocaloric material MnAs:B$_{0.02}$ prepared in Example 1. Generally magnetocaloric materials have a layered crystal structure. On the other hand, as shown in FIGS. 2A and 2B, the magnetocaloric material MnAs:B$_{0.02}$ of Example is in the form of a spherical particle.

Figure 3:
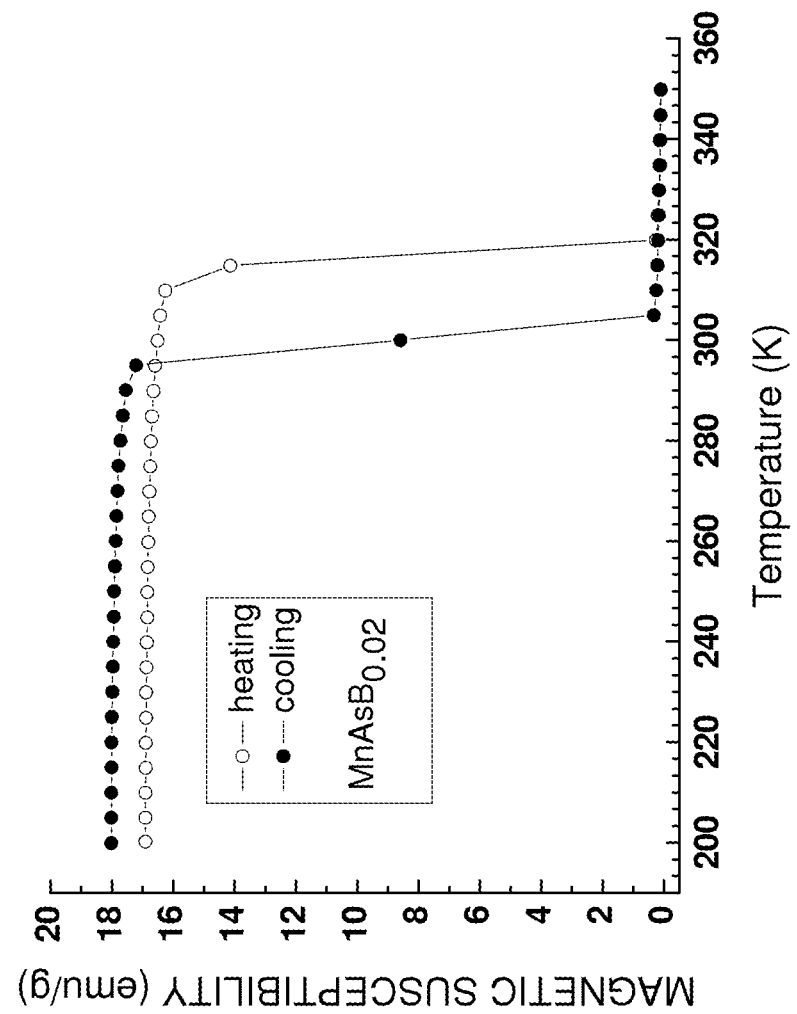
FIG. 3 is a graph of magnetic susceptibility (electromagnetic units per gram, emu/g) versus temperature (Kelvin, K) illustrating magnetic susceptibility of the magnetocaloric material $MnAsB_{0.02}$ of Example 1 with respect to temperature.

The magnetocaloric material MnAs:B$_{0.02}$ prepared in Example 1 was further heat-treated in a vacuum at 800° C. for 3 hours. Magnetic susceptibility changes of the magnetocaloric material with respect to temperature were measured. The results are shown in FIG. 3.

Boron doped in the crystals of the magnetocaloric material may be further uniformly distributed by the secondary heat-treatment.

The magnetic susceptibility was measured using a vibrating sample magnetometer ("VSM"). The magnetic susceptibility was measured by increasing the temperature after cooling the magnetocaloric material in a field-cooled mode, and the magnetic susceptibility was also measured by decreasing the temperature. The measurement was performed in an absolute temperature range of 200 K to 350 K.

Figure 4:
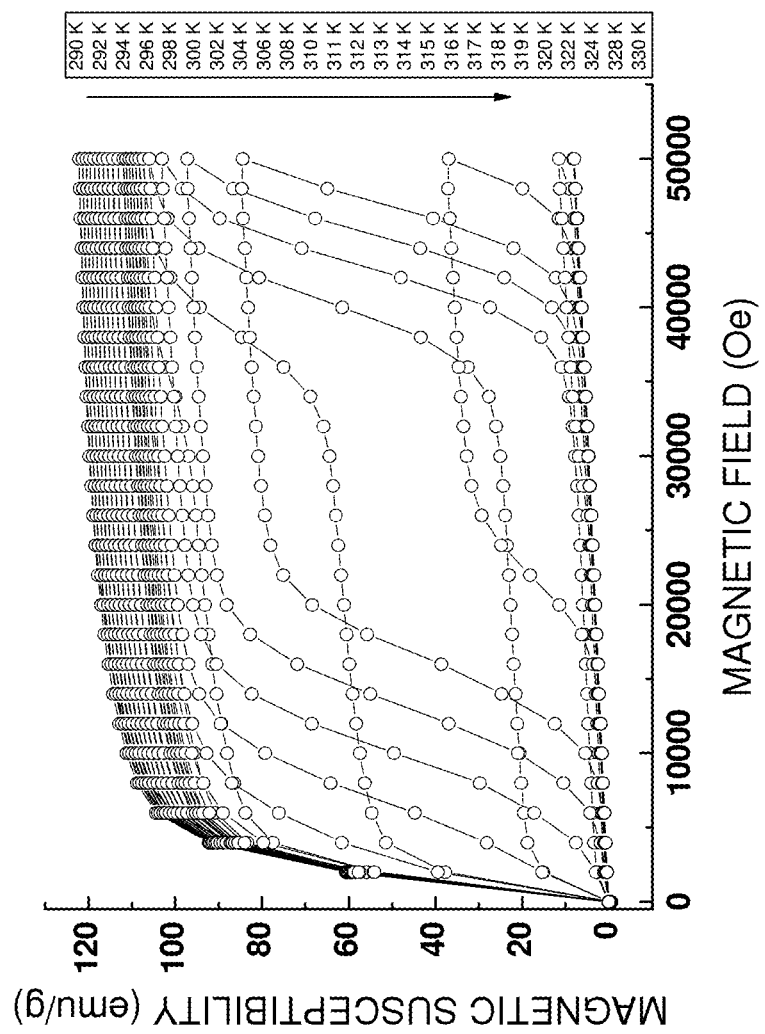
FIG. 4 is a graph of magnetic susceptibility (electromagnetic units per gram, emu/g) versus magnetic field (Oersteds, Oe) illustrating isothermal magnetic susceptibility of the magnetocaloric material $MnAsB_{0.02}$ of Example 1.

Isothermal magnetic susceptibility of the magnetocaloric material MnAs:B$_{0.02}$ prepared in Example 1 was measured at 290 K to 330 K. The results are shown in FIG. 4. The isothermal magnetic susceptibility was measured by measuring magnetic susceptibility while changing a magnetic field from 0 Tesla to 5 Tesla (50000 Gauss) at intervals of 0.2 Tesla (2000 Gauss) at a constant temperature between 290 K and 330 K.

Figure 5:
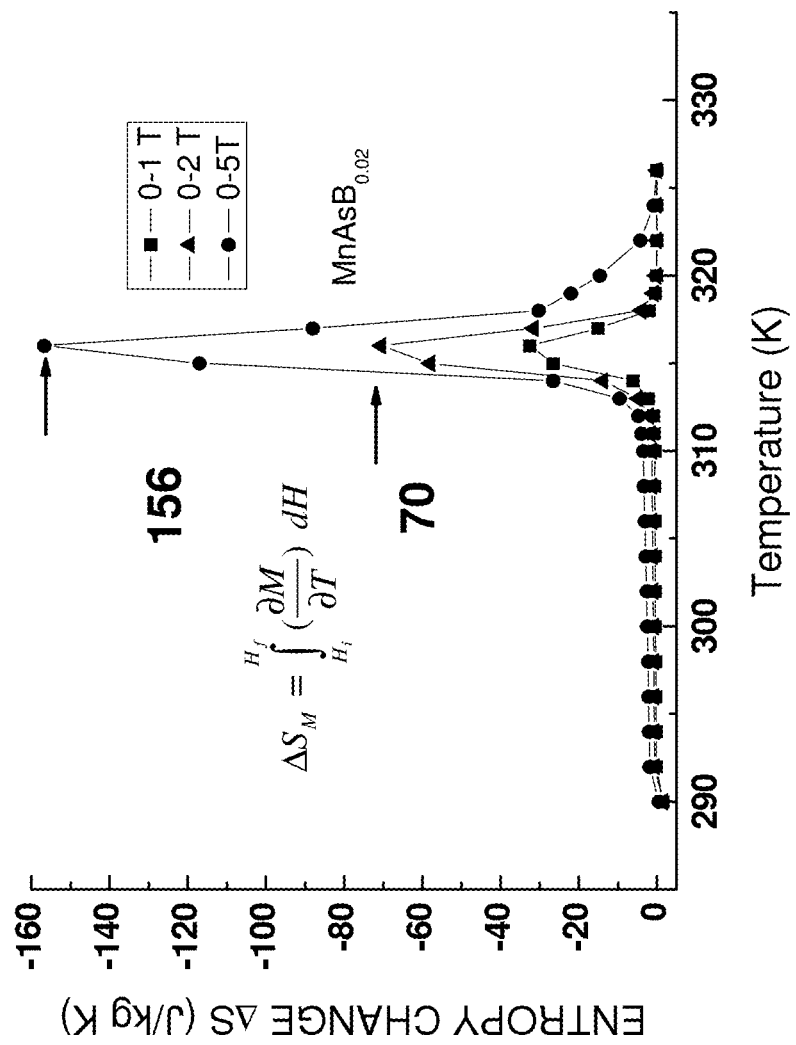
FIG. 5 is a graph of entropy change (Joules per kilogram-Kelvin, J/kg·K) versus temperature (Kelvin, K) illustrating entropy change (ΔS) with respect to a magnetic field change calculated from the isothermal magnetic susceptibility of the magnetocaloric material $MnAsB_{0.02}$ of Example 1.

Based on the isothermal magnetic susceptibility data of FIG. 4, an entropy change (ΔS) with respect to a change of magnetic field was calculated. The results are shown in FIG. 5. The entropy change (ΔS) was calculated using the isothermal magnetic susceptibility data using the Equation 1:

$$\Delta S_M = \int_{H_i}^{H_f} \left(\frac{\partial M}{\partial T}\right) dH$$

In Equation 1, M is magnetic susceptibility, T is temperature, and H is enthalpy.

As shown in FIG. 5, the magnetocaloric material MnAs:B$_{0.02}$ prepared in Example 1 exhibited a high entropy change while the magnetic field changed from 0 to 5 Tesla, which is similar to an entropy change observed when a high pressure is physically applied to a magnetocaloric material.

Example 2

Preparation of MnAs:B$_{0.02}$ in a Liquid Phase Medium 1.9349 g of MnCl$_2$, 1.5210 g of As$_2$O$_3$, 0.0107 g of B$_2$O$_3$, 1.0400 g of Mg and 0.9000 g of NaCl were mixed using a ball mill in a nitrogen atmosphere for 5 hours. The powdered mixture was added to a metal mold and pressed by using a press at 300 kg/cm$^2$ to obtain a cylinder having a diameter of 1 cm and a height of 1 cm. An alumina crucible including the cylinder was added to a quartz tube, and the quartz tube was sealed in a vacuum. The quartz tube was heat-treated in an electrical furnace at 500° C. for 3 hours. A reaction occurring during the heat-treatment is shown in Reaction Scheme 2 below.

Reaction Scheme 2

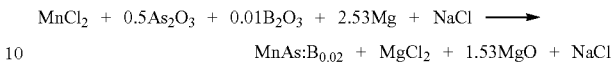

NaCl initially added formed a eutectic mixture with MgCl$_2$ generated during the heat-treatment. The eutectic mixture of NaCl and MgCl$_2$ was melted in the heat-treatment and formed a liquid phase medium. The formation of the liquid phase medium was observed through the quartz tube.

The heat-treated reaction mixture was pulverized in an agate mortar and added to a 0.1 M hydrochloric acid solution, and the mixture was stirred for 1 hour to remove by-products such as NaCl, MgCl$_2$, and MgO. The obtained MnAs:B$_{0.02}$ was washed three times with water and dried.

Figure 6A:
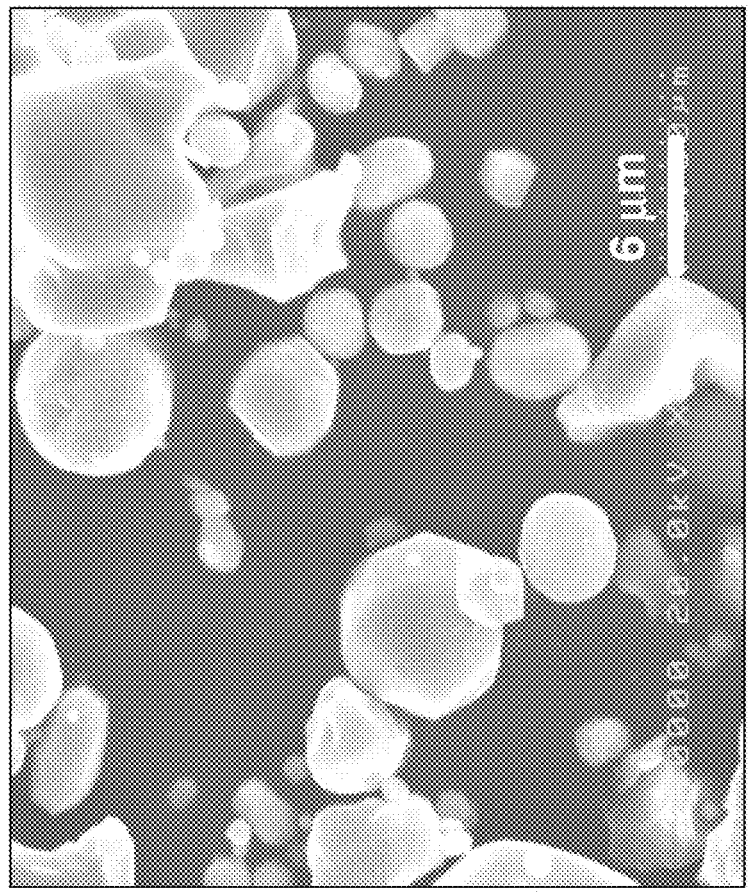
FIGS. 6A and 6B are SEM images of the magnetocaloric material $MnAsB_{0.02}$ of Example 2, which was prepared in the presence of NaCl.
Figure 6B:
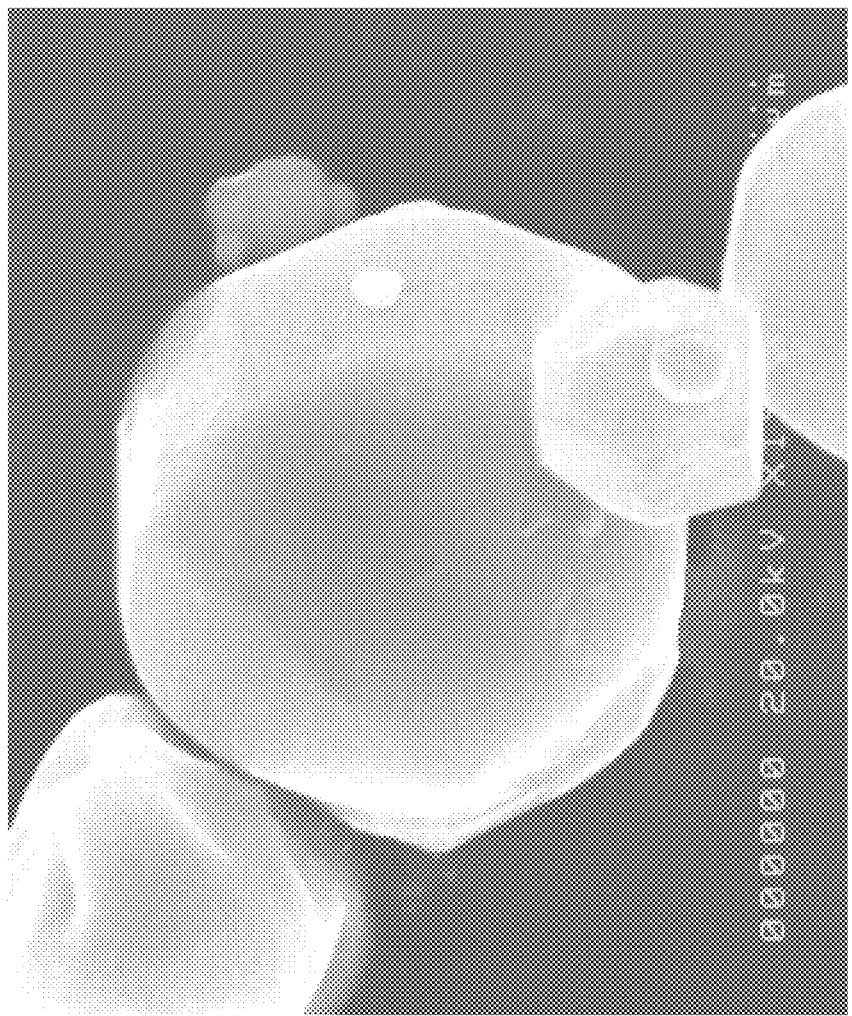

FIG. 6A is an SEM image of a magnetocaloric material MnAs:B$_{0.02}$ prepared in Example 2. FIG. 6B is an SEM image of a single particle of the magnetocaloric material MnAs:B$_{0.02}$ prepared in Example 2. The magnetocaloric material MnAs:B$_{0.02}$ prepared in Example 2, crystals of which grew in the liquid phase medium, had single crystalline particles.

Example 3

Preparation of Mn$_{0.99}$Fe$_{0.01}$AS:B$_{0.02}$ 1.9153 g of MnCl$_2$, 0.0262 g of FeCl$_3$, 0.5352 g of As$_2$O$_3$, 0.0107 g of B$_2$O$_3$, and 1.0420 g of Mg were mixed using a ball mill in a nitrogen atmosphere for 5 hours. The powdered mixture was added to a metal mold and pressed by using a press at 300 kg/cm$^2$ to obtain a cylinder having a diameter of 1 cm and a height of 1 cm. An alumina crucible including the cylinder was added to a quartz tube, and the quartz tube was sealed in a vacuum. The quartz tube was heat-treated in an electrical furnace at 600° C. for 5 hours. A reaction occurring during the heat-treatment is shown in Reaction Scheme 3 below.

Reaction Scheme 3

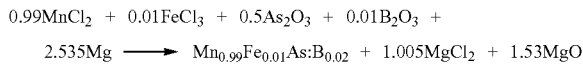

The heat-treated reaction mixture was pulverized in an agate mortar and added to a 0.1 M hydrochloric acid solution, and the mixture was stirred for 1 hour to remove by-products such as MgCl$_2$ and MgO. The obtained Mn$_{0.99}$Fe$_{0.01}$AS:B$_{0.02}$ was washed three times with water and dried.

Figure 7:
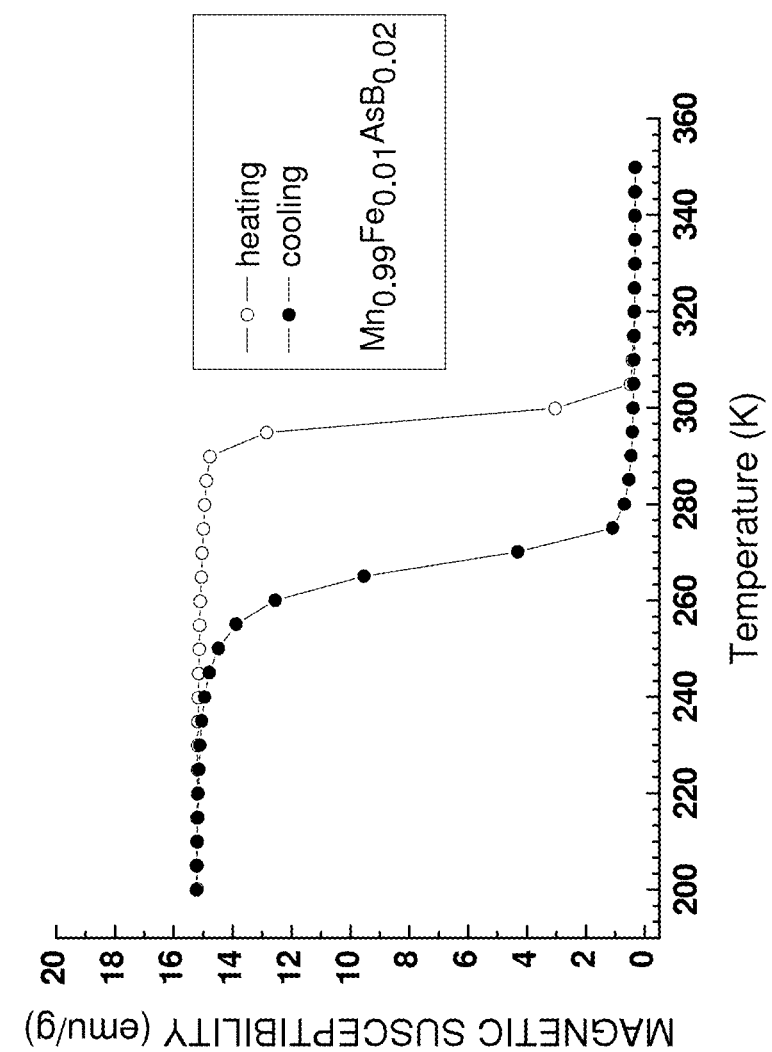
FIG. 7 is a graph of magnetic susceptibility (electromagnetic units per gram, emu/g) versus temperature (Kelvin, K) illustrating magnetic susceptibility of the magnetocaloric material $Mn_{0.99}Fe_{0.01}AsB_{0.02}$ of Example 3 with respect to temperature.

A magnetic susceptibility change of the magnetocaloric material Mn$_{0.99}$Fe$_{0.01}$AS:B$_{0.02}$ prepared in Example 3 with respect to temperature was measured. The results are shown in FIG. 7. The magnetocaloric material Mn$_{0.99}$Fe$_{0.01}$AS:B$_{0.02}$ prepared in Example 3 had a higher thermal hysteresis than the magnetocaloric material MnAs:B$_{0.02}$ prepared in Example 1. This is understood to be because the Mn-position in the crystal lattice was substituted with Fe, thus a resulting chemical pressure effect suppressed the lattice phase transition phenomenon.

Figure 8:
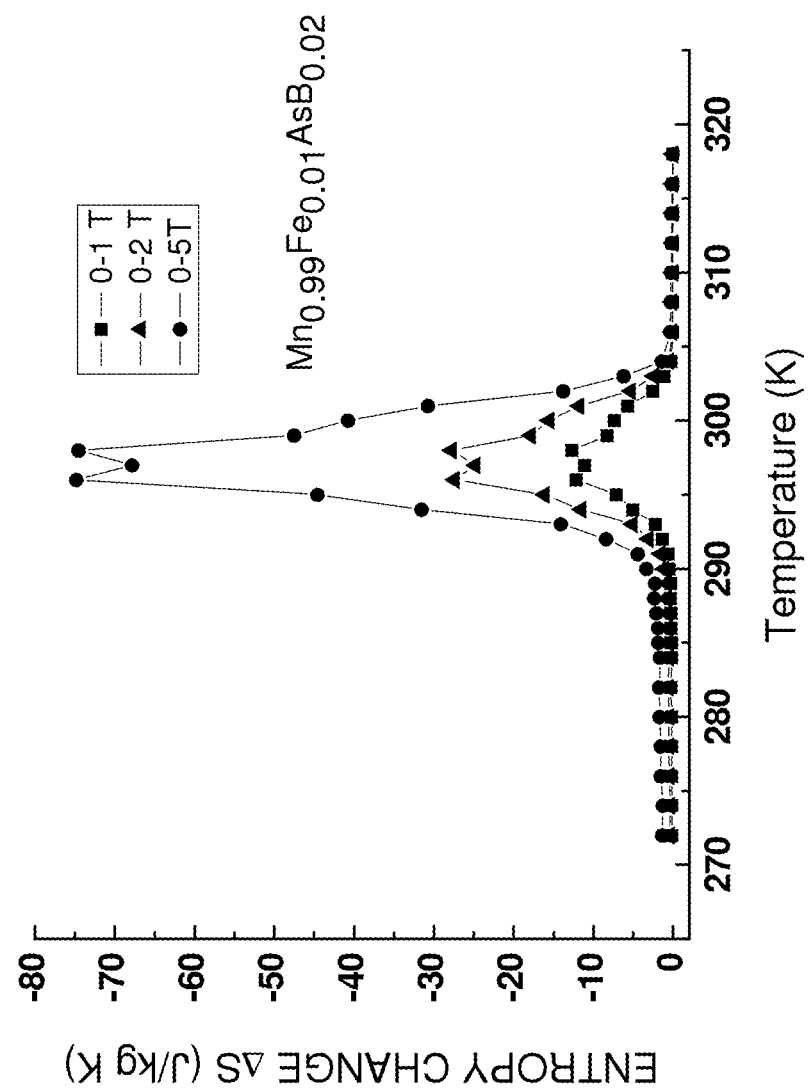
FIG. 8 is a graph of entropy change (Joules per kilogram-Kelvin, J/kg·K) versus temperature (Kelvin, K) illustrating entropy change of the magnetocaloric material $Mn_{0.99}Fe_{0.01}AsB_{0.02}$ of Example 3 with respect to a magnetic field change.

FIG. 8 is a graph illustrating an entropy change of the magnetocaloric material $Mn_{0.99}Fe_{0.01}AS:B_{0.02}$ prepared in Example 3 with respect to a magnetic field change. The magnetocaloric material $Mn_{0.99}Fe_{0.01}As:B_{0.02}$ prepared in Example 3 had a lower entropy change than the magnetocaloric material $MnAs:B_{0.02}$ prepared in Example 1.

Example 4

Preparation of $MnFeP_{0.45}As_{0.55}:B_{0.02}$ 1.5168 g of $MnCl_2$, 2.0528 g of $FeCl_3$, 0.1680 g of P, 0.6558 g of $As_2O_3$, 0.0084 g of $B_2O_3$ and 1.0715 g of Mg were mixed using a ball mill in a nitrogen atmosphere for 5 hours. The powdered mixture was added to a metal mold and pressed by using a press at 300 kg/cm² to obtain a cylinder having a diameter of 1 cm and a height of 1 cm. An alumina crucible including the cylinder was added to a quartz tube, and the quartz tube was sealed in a vacuum. The quartz tube was heat-treated in an electrical furnace at 800° C. for 6 hours. A reaction occurring during the heat-treatment is shown in Reaction Scheme 4 below.

Reaction Scheme 4

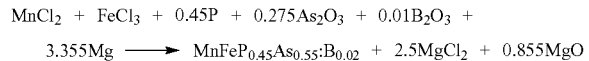

$MnCl_2 + FeCl_3 + 0.45P + 0.275As_2O_3 + 0.01B_2O_3 +$
$3.355Mg \longrightarrow MnFeP_{0.45}As_{0.55}:B_{0.02} + 2.5MgCl_2 + 0.855MgO$ The heat-treated reaction mixture was pulverized in an agate mortar and added to a 0.1 M hydrochloric acid solution, and the mixture was stirred for 1 hour to remove by-products such as $MgCl_2$ and MgO. The obtained $MnFeP_{0.45}As_{0.55}:B_{0.02}$ was washed three times with water and dried.

Figure 9:
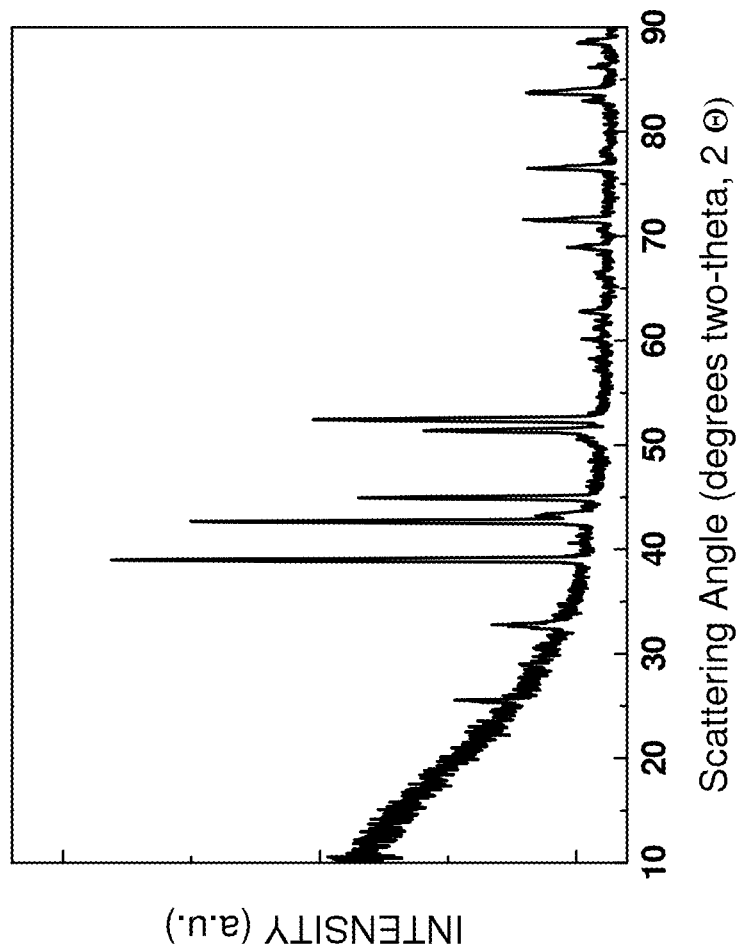
FIG. 9 is a graph of intensity (arbitrary units) versus scattering angle (degrees two theta, 2θ) illustrating X-ray diffraction analysis results of the magnetocaloric material $MnFeP_{0.45}As_{0.55}$:$B_{0.02}$ prepared in Example 4.

FIG. 9 is a graph illustrating the results of X-ray diffraction analysis of the magnetocaloric material $MnFeP_{0.45}As_{0.55}:B_{0.02}$ prepared in Example 4. Referring to FIG. 9, it was determined that a single crystalline material was produced.

Figure 10A:
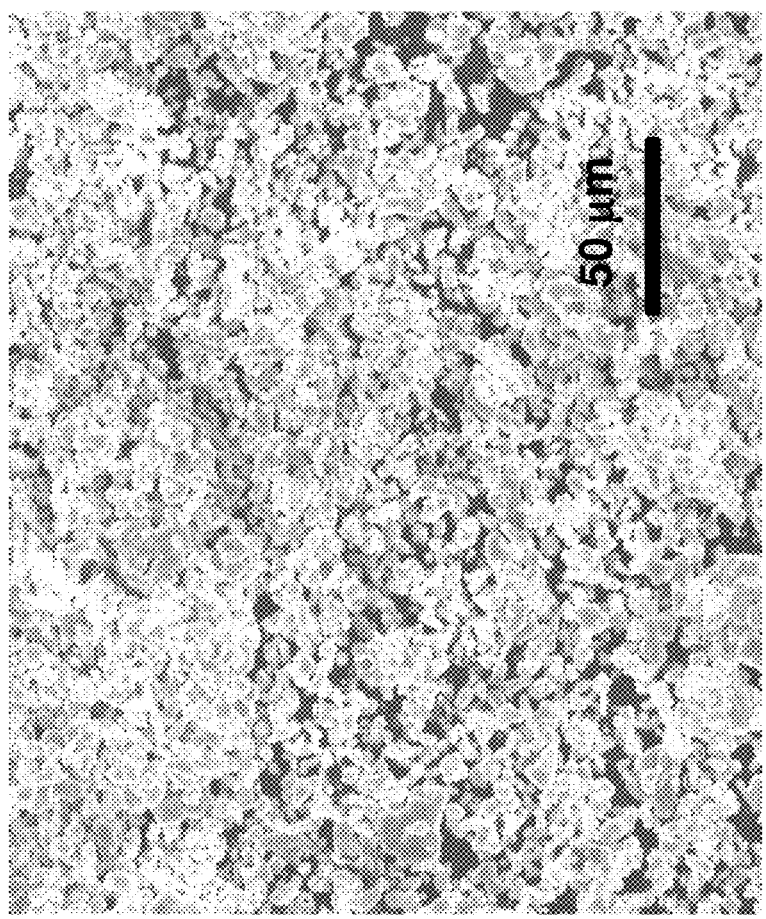
FIGS. 10A and 10B are SEM images of the magnetocaloric material $MnFeP_{0.45}As_{0.55}B_{0.02}$ of Example 4.
Figure 10B:
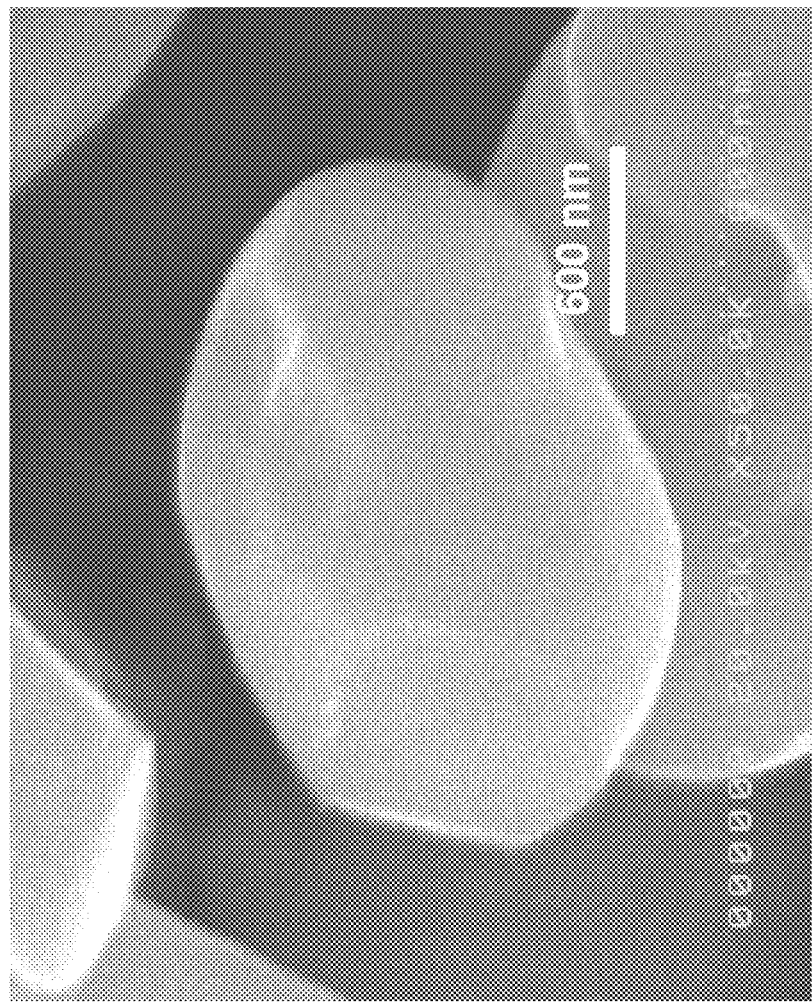

FIG. 10A is an SEM image of the magnetocaloric material $MnFeP_{0.45}As_{0.55}:B_{0.02}$ prepared in Example 4. FIG. 10B is an SEM image of a single crystalline particle of the magnetocaloric material $MnFeP_{0.45}As_{0.55}:B_{0.02}$ prepared in Example 4. The particle size of the magnetocaloric material $MnFeP_{0.45}As_{0.55}:B_{0.02}$ prepared in Example 4 was equal to or less than 10 µm.

Figure 11:
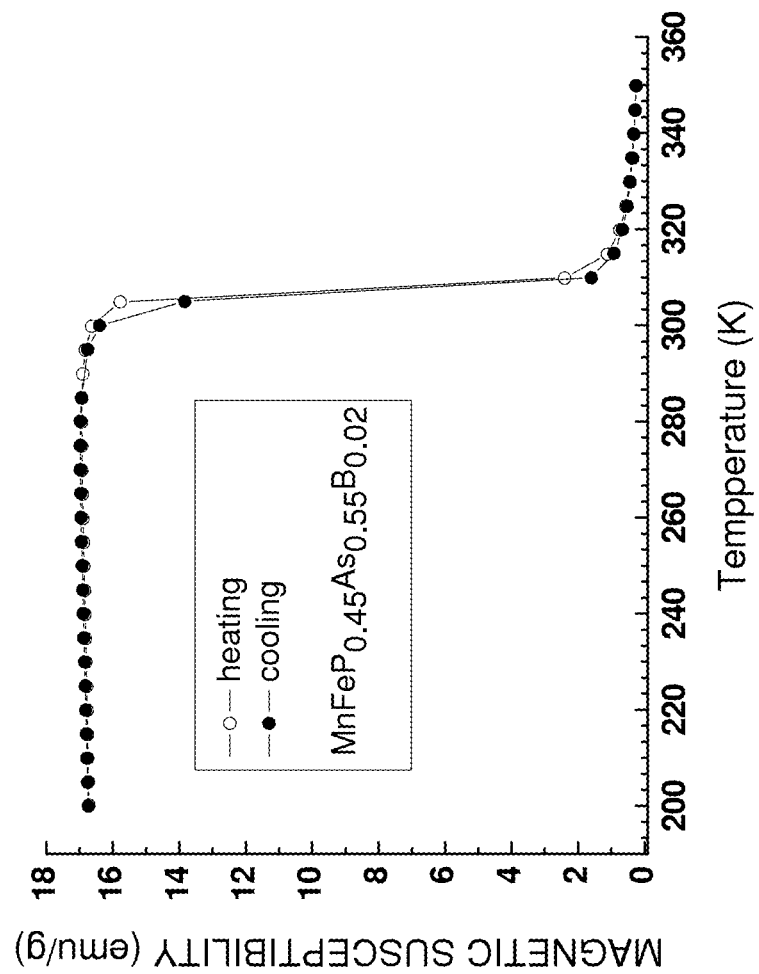
FIG. 11 is a graph of magnetic susceptibility (electromagnetic units per gram, emu/g) versus temperature (Kelvin, K) illustrating magnetic susceptibility of the magnetocaloric material $MnFeP_{0.45}As_{0.55}B_{0.02}$ of Example 4 with respect to temperature.

FIG. 11 is a graph illustrating magnetic susceptibility of the magnetocaloric material $MnFeP_{0.45}As_{0.55}:B_{0.02}$ prepared in Example 4 with respect to temperature.

Figure 12:
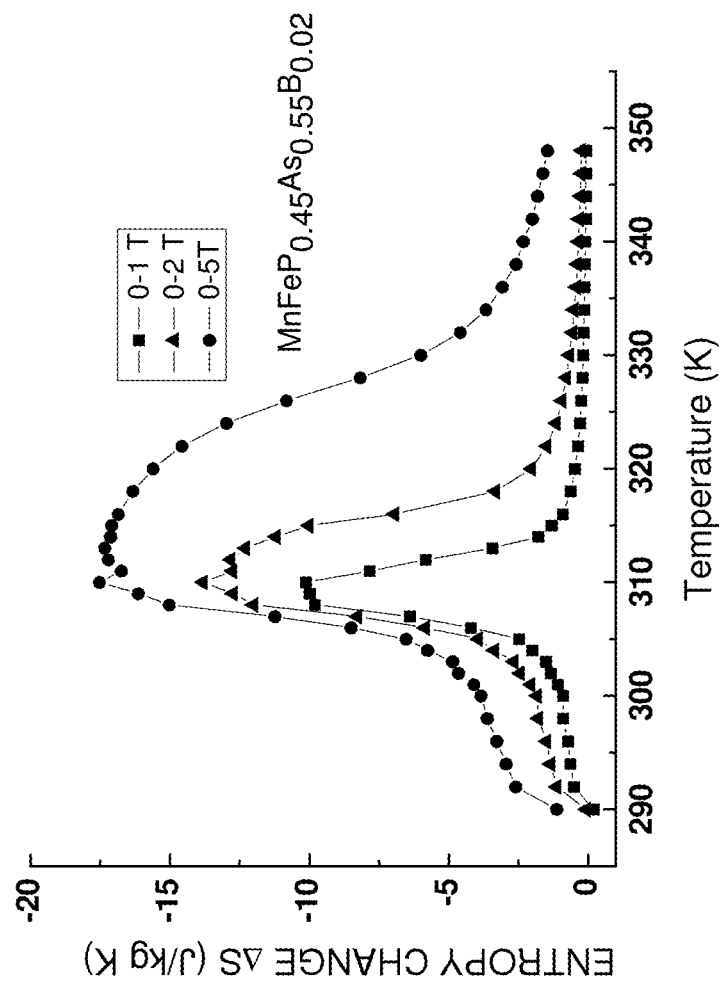
FIG. 12 is a graph of entropy change (Joules per kilogram-Kelvin, J/kg·K) versus temperature (Kelvin, K) illustrating entropy change (ΔS) of the magnetocaloric material $MnFeP_{0.45}As_{0.55}B_{0.02}$ of Example 4 with respect to a magnetic field change.

Referring to FIG. 11, an entropy change (ΔS) with respect to a magnetic field change was calculated. FIG. 12 is a graph illustrating an entropy change (ΔS) of the magnetocaloric material $MnFeP_{0.45}As_{0.55}:B_{0.02}$ prepared in Example 4 with respect to a magnetic field change. At a high magnetic field equal to or greater than 2 Telsa, a phase transition induced magnetic field was observed.

As described above, according to the one or more of the above embodiments, in a transition metal pnictide magnetocaloric material in which boron is doped, e.g., interstitially doped, magnetic hysteresis may decrease and magnetic entropy change may increase due to the doping of the boron, so that a magnetocaloric effect may be improved.

Cooling efficiency of a magnetic refrigerator may be improved or the magnetic refrigerator may be provided using the transition metal pnictide magnetocaloric material in which boron is doped.

A transition metal pnictide magnetocaloric material in which boron is uniformly doped may be mass-produced in a simple process using a method of preparing a transition metal pnictide magnetocaloric material in which boron is interstitially doped.

A transition metal pnictide magnetocaloric material having a uniform particle size may be mass-produced in a simple process using a method of preparing a transition metal pnictide magnetocaloric material in which boron is interstitially doped.

The magnetocaloric material may be applied to, for example, highly efficient eco-friendly magnetic cooling refrigerators, air-conditioners, and heat pumps, which do not use a gas refrigerant causing the greenhouse effect. Particularly, if applied to a cooling and heating device of a vehicle, fuel efficiency of the vehicle, e.g., a hybrid vehicle or an electric vehicle, may be improved by using the magnetocaloric material due to the higher efficiency of the cooling and heating device. The magnetocaloric material may be applied to, for example, a cooling device that has low-noise or is noiseless.

It should be understood that the exemplary embodiments described herein shall be considered in a descriptive sense only and not for purposes of limitation. Descriptions of features, advantages, or aspects within each embodiment should be considered as available for other similar features, advantages or aspects in other embodiments.

What is claimed is:

1. A method of preparing a boron-doped transition metal pnictide magnetocaloric material, the method comprising:
    contacting
        a transition metal halide;
        a pnictogen element, a pnictogen oxide, or a combination thereof;
        a boron-containing oxide; and
        a reducing metal to provide a mixture; and
    heat-treating the eutectic mixture to prepare the boron-doped transition metal pnictide magnetocaloric material
    wherein
    the transition metal halide includes a plurality of transition metal halides, and wherein transition metal halides of the plurality of transition metal halides form eutectic mixture that melts during the heat-treating,
    the reducing metal forms a first reducing metal halide during the heat-treating, and the first reducing metal halide and the transition metal halide form a eutectic mixture that melts during the heat-treating,
    the reducing metal includes a plurality of reducing metals, wherein the plurality of reducing metals forms a plurality of reducing metal halides during the heat-treating, and wherein second and third reducing metal halides of the plurality of reducing metal halides form a eutectic mixture that melts during the heat-treating, or further comprising a fourth reducing metal halide, wherein the fourth reducing metal halide and the transition metal halide form a eutectic mixture that melts during the heat-treating, or the fourth reducing metal halide and the first reducing metal halide form a eutectic mixture that melts during the heat-treating, or
    further comprising a plurality of reducing metal halides, wherein compounds of the plurality of reducing metal halides form a eutectic mixture that melts during the heat-treating.

2. The method of claim 1, wherein the transition metal halide comprises a halide of Mn, Fe, Co, Ni, Cr, V, Cu, Nb, Y, La, Ce, Pr, Nd, Pm, Sm, Eu, Gd, Tb, Dy, Ho, Er, Tm or Yb, or a combination thereof.

3. The method of claim 1, wherein the transition metal halide comprises a transition metal fluoride, a transition metal chloride, a transition metal bromide, a transition metal iodide, or a combination thereof.

4. The method of claim 3, wherein the transition metal halide comprises $MnF_3$, $MnF_4$, $MnCl_2$, $MnCl_3$, $MnBr_2$, $MnI_2$, $FeF_2$, $FeF_3$, $FeCl_3$, $FeCl_2$, $FeBr_2$, $FeBr_3$, $FeI_2$, $FeI_3$, $CoF_2$, $CoF_3$, $CoF_4$, $CoCl_2$, $CoCl_3$, $CoBr_2$, $CoI_2$, $NiF_2$, $NiCl_2$, $NiI_2$, $CrF_2$, $CrF_3$, $CrF_4$, $CrF_5$, $CrF_6$, $CrCl_2$, $CrCl_3$, $CrCl_4$, $CrBr_2$, $CrBr_3$, $CrBr_4$, $CrI_2$, $CrI_3$, $CrI_4$, $VF_2$, $VF_3$, $VF_4$, $VF_5$, $VCl_2$, $VCl_3$, $VCl_4$, $VBr_2$, $VBr_3$, $VBr_4$, $VI_2$, $VI_3$, $VI_4$, $CuF$, $CuF_2$, $CuCl$, $CuCl_2$, $CuBr_2$, $CuI$, or a combination thereof.

5. The method of claim 1, wherein the pnictogen element, the pnictogen oxide, or the combination thereof comprises P, As, Sb, Bi, or a combination thereof.

6. The method of claim 1, wherein the boron-containing oxide comprises $B_2O_3$, $NaBO_2$, $BO_3H_3$, or a combination thereof.

7. The method of claim 1, wherein the reducing metal comprises Li, Na, K, Rb, Cs, Be, Mg, Ca, Sr, Ba, Al, or a combination thereof.

8. The method of claim 1, wherein a content of the boron-containing oxide in the mixture is selected such that the content of boron in the boron-doped transition metal pnictide magnetocaloric material is about 0.001 atomic percent to about 10 atomic percent, based on a total amount of the boron-doped transition metal pnictide magnetocaloric material.

9. The method of claim 1, wherein a content of the boron-containing oxide in the mixture is selected such that the content of boron in the boron-doped transition metal pnictide magnetocaloric material is about 0.001 weight percent to about 10 weight percent, based on a total weight of the boron-doped transition metal pnictide magnetocaloric material.

10. The method of claim 1, wherein a content of the reducing metal in the mixture is about 50 parts by weight to about 200 parts by weight, based a total weight of the transition metal halide and the pnictogen element, the pnictogen oxide, or the combination thereof.

11. The method of claim 1, wherein the heat-treating of the mixture is at about 300 to about 1200° C.

12. The method of claim 1, further comprising annealing after the heat-treating, wherein the annealing comprises heating at about 300 to about 1200° C. for about 10 minutes to about 20 hours.

13. The method of claim 1, further comprising removing a by-product from the heat-treated mixture.

14. The method of claim 13, wherein the removing comprises contacting a product of the heat-treating with an aqueous solution.

15. The method of claim 1, wherein at least a portion of the mixture is melted during the heat-treating to form a liquid phase medium.

16. The method of claim 1, wherein at least one of the reducing metal halides is of the formula LiX, NaX, KX, RbX, CsX, $BeX_2$, $MgX_2$, $CaX_2$, $SrX_2$, $BaX_2$, $AlX_3$, or a combination thereof, wherein X is F, Cl, Br, I, or combination thereof.

17. The method of claim 1, wherein the contacting further comprises contacting with a Group 14 element, an oxide of a Group 14 element, or a combination thereof.

18. A method of preparing a magnetocaloric material, the method comprising:
    contacting
        a transition metal halide;
        a pnictogen element, a pnictogen oxide, or a combination thereof;
        a boron-containing oxide; and
        a reducing metal to provide a mixture;
    providing a reducing metal halide of the formula LiX, NaX, KX, RbX, CsX, $BeX_2$, $MgX_2$, $CaX_2$, $SrX_2$, $BaX_2$, $AlX_3$, or a combination thereof, wherein X is F, Cl, Br, I, or combination thereof;
    heat-treating the mixture and the reducing metal halide at about 400 to about 800° C. to form a eutectic mixture; and
    washing the eutectic mixture with an aqueous solution to prepare the magnetocaloric material.

* * * * *